Feb. 6, 1923.
J. WILKINSON.
FLEXIBLE COUPLING.
FILED AUG. 9, 1920.
1,444,439.
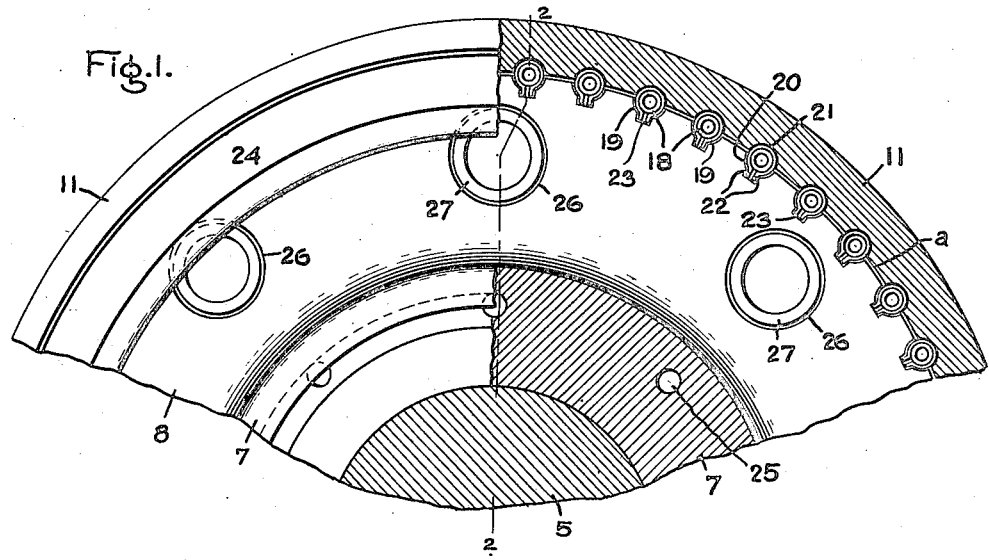
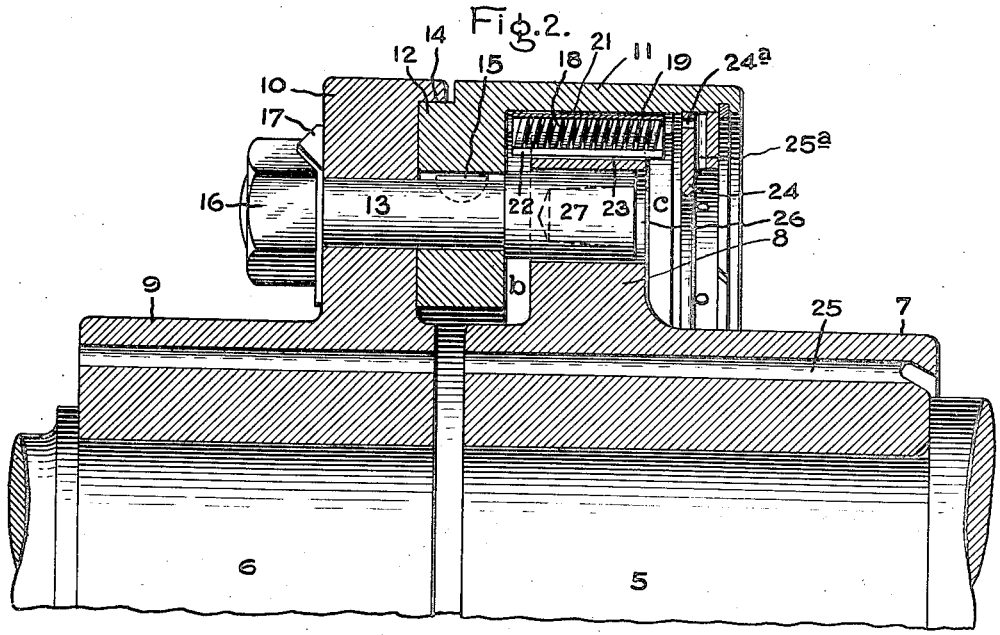
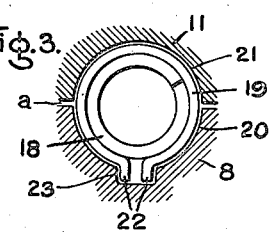
Inventor:
James Wilkinson,
by Albert G. Davis
His Attorney.

Patented Feb. 6, 1923.

1,444,439

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

FLEXIBLE COUPLING.

Application filed August 9, 1920. Serial No. 402,264.

*To all whom it may concern:*

Be it known that I, JAMES WILKINSON, a citizen of the United States, residing at Schenectady, in the county of Schenectady, State of New York, have invented certain new and useful Improvements in Flexible Couplings, of which the following is a specification.

The present invention relates to flexible couplings for connecting together adjacent rotating shaft ends, such as, for example, adjacent ends of a driving and a driven shaft, and has for its object to provide an improved structure and arrangement in a coupling of this character.

For a consideration of what I believe to be novel and my invention, attention is directed to the accompanying description and the claims appended thereto.

In the drawing, Fig. 1 is an end view partly in section of a coupling embodying my invention, a part only of the coupling being shown; Fig. 2 is a sectional view taken on line 2—2, Fig. 1; and Fig. 3 is a detail.

Referring to the drawing, 5 and 6 indicate adjacent shaft ends, shaft 5 being a driving shaft, for example, and shaft 6 a driven shaft. On shaft 5 is mounted a hub 7 provided with a coupling flange 8 and on shaft 6 is mounted a hub 9 provided with a coupling flange 10. Surrounding flange 8 and slightly spaced therefrom as indicated at *a* is an annular ring 11 which is carried by flange 10. Ring 11 may be fastened to flange 10 in any suitable manner but preferably I provide it with an inturned flange 12, which is fastened to flange 10 by bolts 13. Ring 11 is centered with respect to flange 10 by engaging shoulders as indicated at 14, and bolts 13 may be fixed in the opening in flange 12 through which they pass by keys 15. Nuts for bolts 10 are indicated at 16 and locking means for the nuts at 17.

For transmitting power from one shaft to the other, flange 8 is connected to ring 11 by a series of circumferentially spaced axially extending springs 18 located in sleeves 19 which in turn are located in complementary grooves 20 and 21 formed in the adjacent surfaces of flange 8 and ring 11. Grooves 20 and 21 are semi-circular so that each pair of opposed grooves forms a cylindrical hole. Sleeves 19 are formed from sheets of suitable material bent around to form cylinders. The two meeting edges are not joined together, however, but are slightly spaced apart and are turned outwardly to form flanges 22 which fit in slots 23 at the bottoms of grooves 20. This serves to keep sleeves 19 from turning and also permits the edges to be squeezed together to compress springs 18 by compressing the sides of the spring. Springs 18 are preferably in the form of coiled annular springs with the coils slightly spaced apart axially as shown in Fig. 2.

A retaining ring 24 is provided to keep springs 18 and sleeves 19 in place, such ring also serving as an oil retainer and water separating ring.

Lubricant is supplied to the coupling through opening 25 from the inner end of which it is thrown out by centrifugal force against the inner surface of ring 11, the oil passing through and around springs 18 and sleeves 19. In ring 24 is an opening 24$^a$ which connects with a radial discharge passage 25$^a$. A centrifugal oil head will be established in the annular spaces marked *b* and *c* and any water in the oil, since it is heavier than oil, will be thrown out by centrifugal force and escape through opening 24$^a$ and discharge passage 25$^a$. Passage 25$^a$ will become filled with water forming a column which is balanced by the column of oil in space *c*. The greater density of the water in passage 25$^a$ over that in space *c* is compensated for by raising the centrifugal oil level in space *c*.

In flange 8 are a series of circumferentially spaced holes 26 into which pins 27 carried by flange 12 project. Preferably pins 27 are made as an integral part of bolts 13 as this gives a compact structure and lessens the number of parts in the coupling. Holes 26 are of slightly larger diameter than pins 27 so that normally such pins stand in spaced relation to the surfaces of holes 26.

Flange 12 is spaced from flange 8 a distance sufficient to permit of ring 11 and flange 12 being moved axially far enough to disengage shoulders 15 so that by removing bolts 13 and shifting ring 11 and flange 12 axially either shaft 5 or 6 may be then lifted vertically.

In operation power is transmitted between flange 8 and ring 11 by the sleeves 19 and springs 18 and, as is obvious, the coupling is adapted for rotation in either direction. The springs 18 are adapted to be compressed to a limited degree, expanding longitudinally when squeezed and due to this the load on the coupling will be equally distributed among the springs, for if any one tends to be excessively loaded it will yield slightly thereby transferring some of its load to other springs. Also in case of momentary excess load on the coupling in the form of a blow, all the springs may yield to absorb the shock occasioned thereby. Pins 27 are in the nature of safety devices or stops. After a certain amount of yielding action takes place they come into play to take up the load. Also in case the springs should break or become inoperative for any reason, pins 27 will take the load and maintain the coupling in operative condition. During operation the two shaft ends can adjust themselves axially relatively to each other, flange 8 and ring 11 sliding on sleeves 19.

In actual use shaft 6 may be the shaft of a driven apparatus, for example, the shaft for the pinion of a high speed gearing, and in case it becomes desirable to renew the pinion, bolts 13 can be removed and ring 11 slid axially to disengage shoulders 14, whereupon the pinion including shaft 6 and flange 10 may be removed and a new pinion with a flange thereon substituted, the new flange 10 being then bolted to flange 12. This does not in any way disturb the adjustment of the coupling so far as regards spring rollers 18, the flange 10 being in substance only a bolting flange and hence not requiring extreme accuracy in fitting it to flange 12.

In accordance with the provisions of the patent statutes, I have described the principle of operation of my invention, together with the apparatus which I now consider to represent the best embodiment thereof, but I desire to have it understood that the apparatus shown is only illustrative and the invention may be carried out by other means.

What I claim as new and desire to secure by Letters Patent of the United States, is:

1. In a coupling for connecting adjacent shaft ends, a flange carried by one shaft end, a ring surrounding said flange and carried by the other shaft end, adjacent surfaces of said flange and ring being provided with complementary axially extending grooves, compressible sleeves located in said grooves and springs in said sleeves, said sleeves and springs serving to transmit power between the flange and ring.

2. In a coupling for connecting adjacent shaft ends, a flange carried by each shaft, a ring having a flange which is fastened to one of said shaft flanges, said ring surrounding the other shaft flange, spring means connecting said ring and the flange which it surrounds, and means independent of said spring means for connecting said ring and the flange which it surrounds, said means comprising pins carried by the flange on the ring and projecting into openings in the shaft flange which the ring surrounds, such openings being of greater diameter than the pins.

3. In a coupling for adjacent shaft ends, a flange carried by one shaft end and having spaced openings therein, a flange carried by the other end, circumferentially yieldable spring means connecting said shaft ends, and means independent of said spring means for connecting the said shaft ends, said last-named means comprising pins carried by the second named flange and projecting into the opening in the first named flange in spaced relation to the walls thereof.

4. In a coupling for adjacent shaft ends, a flange on one shaft end, a flange provided with circumferentially spaced openings on the other shaft end, a ring having a flange fastened to the first named flange, said ring surrounding the second named flange, circumferentially yieldable means connecting said ring and second named flange for transmitting power from one to the other, and pins carried by the flange on said ring and projecting into the openings in said second named flange in spaced relation to the walls thereof.

5. In a coupling for adjacent shaft ends, a flange on one shaft end, a flange provided with circumferentially spaced openings on the other shaft end, a ring which surrounds the second named flange and has a flange at one end, bolts connecting such flange to the first named flange, circumferentially yieldable means connecting the ring and the flange which it surrounds, and pins formed integral with said bolts and projecting into the openings in the second named flange in spaced relation to the walls thereof.

6. In a coupling for adjacent shaft ends, a flange on one shaft end, a flange provided with circumferentially spaced openings on the other shaft end, a ring having a flange fastened to the first named flange and surrounding the second named flange, such flanges having interlocking shoulders, circumferentially yieldable means connecting said ring and second named flange for transmitting power from one to the other, and pins carried by the flange on said ring and projecting into the openings in said second named flange in spaced relation to the walls thereof, said flange on the ring being spaced from the second named flange a distance sufficient to permit it to move axially to disengage said shoulders.

In witness whereof, I have hereunto set my hand this 6th day of August, 1920.

JAMES WILKINSON.